United States Patent
Arcabascio (10) Patent No.: US 9,220,252 B1
(45) Date of Patent: Dec. 29, 2015

(54) TROLLING ROD OUTRODDER

(71) Applicant: Anthony F. Arcabascio, Bayville, NJ (US)

(72) Inventor: Anthony F. Arcabascio, Bayville, NJ (US)

( * ) Notice: Subject to any disclaimer, the term of this patent is extended or adjusted under 35 U.S.C. 154(b) by 0 days.

(21) Appl. No.: 14/726,470

(22) Filed: May 30, 2015

(51) Int. Cl.
*F16M 13/00* (2006.01)
*A01K 97/10* (2006.01)
*F16M 13/02* (2006.01)

(52) U.S. Cl.
CPC .............. *A01K 97/10* (2013.01); *F16M 13/022* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 2,529,148 | A | * | 11/1950 | Fratt | A01K 97/10 248/515 |
| 3,000,599 | A | * | 9/1961 | Honig | A01K 97/10 248/278.1 |
| 3,162,408 | A | * | 12/1964 | Markman | A01K 97/10 248/515 |
| 3,570,793 | A | * | 3/1971 | Shackel | A01K 97/10 248/205.1 |
| 4,097,017 | A | * | 6/1978 | Hazlitt | A01K 97/10 248/515 |
| 4,198,775 | A | * | 4/1980 | Leisner | A01K 97/10 43/21.2 |
| 4,407,089 | A | * | 10/1983 | Miller | A01K 97/10 43/21.2 |
| 4,641,453 | A | * | 2/1987 | Roberts, Sr. | A01K 97/10 43/17 |
| 4,932,152 | A | * | 6/1990 | Barlotta | A01K 97/10 248/515 |
| 5,054,737 | A | * | 10/1991 | DeLancey | A01K 97/10 248/515 |
| 5,065,540 | A | * | 11/1991 | Potter, Jr. | A01K 97/10 114/364 |
| 5,210,971 | A | * | 5/1993 | Efantis | A01K 97/10 248/514 |
| 5,301,451 | A | * | 4/1994 | VanAssche | A01K 91/08 43/21.2 |
| 5,359,802 | A | * | 11/1994 | Gutierrez | A01K 97/11 43/15 |
| 5,464,182 | A | * | 11/1995 | Stekelenburg | F16M 13/02 248/276.1 |
| 5,588,630 | A | * | 12/1996 | Chen-Chao | F16C 11/10 248/514 |
| 5,761,844 | A | * | 6/1998 | Horschel | A01K 97/10 248/131 |
| 5,778,592 | A | * | 7/1998 | Malmberg | A01K 97/10 43/21.2 |
| 5,871,196 | A | * | 2/1999 | Martelli | A01K 97/10 248/514 |
| 5,921,014 | A | * | 7/1999 | Lee | A01K 91/08 248/514 |

(Continued)

*Primary Examiner* — Monica Millner
(74) *Attorney, Agent, or Firm* — Sean R. Wilsusen (57) ABSTRACT

Exemplary embodiments of the present invention provide a fishing rod outrodder including a fishing rod holder having an expanded first portion, a tubular second portion and a narrowed third portion. The narrowed third portion includes a cross-beam configured to contact a bottom surface of a fishing rod. A rocker arm is disposed on a bottom portion of the tubular second portion of the fishing rod holder. The rocker arm includes an angled front portion, a substantially flat bottom portion and a rounded rear portion. The rocker arm is configured to articulate the fishing rod holder between a substantially vertical and a substantially horizontal position. The substantially flat bottom portion is configured to stop the fishing rod holder from articulating when the fishing rod holder is in the substantially horizontal position.

8 Claims, 6 Drawing Sheets

(56) References Cited

U.S. PATENT DOCUMENTS

| | | | | |
|---|---|---|---|---|
| 5,937,564 A * | 8/1999 | Perreault | A01K 97/10 | 43/21.2 |
| 6,357,166 B1 * | 3/2002 | Malmanger | A01K 97/10 | 248/21.2 |
| 6,438,889 B1 * | 8/2002 | Handy | A01K 97/10 | 248/166 |
| 6,646,557 B2 * | 11/2003 | Brake | A01K 97/125 | 340/573.2 |
| 7,448,590 B1 * | 11/2008 | Holton | G09F 17/00 | 116/173 |
| 7,669,361 B2 * | 3/2010 | Baez | A01K 91/08 | 114/255 |
| 8,141,839 B2 * | 3/2012 | Buchner | A63B 55/008 | 248/229.15 |
| 8,146,879 B2 * | 4/2012 | Liao | A45B 11/00 | 135/135 |
| 8,375,621 B1 * | 2/2013 | Tarr | A01K 97/12 | 43/16 |
| 8,430,052 B2 * | 4/2013 | Nihra | G09F 17/00 | 116/173 |
| 8,468,736 B2 * | 6/2013 | Blondek | A01K 91/08 | 114/255 |
| 2005/0005500 A1 * | 1/2005 | Howley | A01K 97/10 | 43/21.2 |
| 2005/0172534 A1 | 8/2005 | Arcabascio | | |
| 2010/0083557 A1 * | 4/2010 | Stanton | A01K 97/10 | 43/21.2 |
| 2014/0360086 A1 * | 12/2014 | Finlan | A01K 97/10 | 43/21.2 |
| 2015/0000177 A1 * | 1/2015 | Liney | A01K 97/10 | 43/21.2 |

\* cited by examiner

TROLLING ROD OUTRODDER

FIELD OF THE INVENTION

Exemplary embodiments of the present invention relate to a trolling rod outrodder. More particularly, exemplary embodiments of the present invention relate to a trolling rod outrodder having a locking mechanism for anchoring the trolling rod outrodder to a boat.

DISCUSSION OF RELATED ART

Fishing may involve the use of a wide array of fishing techniques. One such fishing technique is to troll a fishing lure, such as a bunker spoon, behind a boat that is proceeding along the surface of the water. Trolling with a fishing lure, such as a bunker spoon, may include the use of a variety of fishing rods, which may each be equipped with a desired form of fishing line, such as stainless steel wire line, monel trolling line, or metered braid trolling line. When trolling with a fishing lure, such as a bunker spoon, it may be desirable to place the fishing rod in a rod holder which is coupled to the boat.

SUMMARY

Exemplary embodiments of the present invention provide a fishing rod outrodder including a fishing rod holder having an expanded first portion, a tubular second portion and a narrowed third portion. The narrowed third portion includes a cross-beam configured to contact a bottom surface of a fishing rod. A rocker arm is disposed on a bottom portion of the tubular second portion of the fishing rod holder. The rocker arm includes an angled front portion, a substantially flat bottom portion and a rounded rear portion. The rocker arm is configured to articulate the fishing rod holder between a substantially vertical and a substantially horizontal position. The substantially flat bottom portion is configured to stop the fishing rod holder from articulating when the fishing rod holder is in the substantially horizontal position. The rocker arm includes a first through hole configured to rotatably couple the rocker arm to a support arm assembly and a second through hole configured to receive a locking pin. The support arm assembly includes a first support arm and a second support arm. The support arm assembly includes a center channel configured to receive the rocker arm between the first support arm and the second support arm. Each of the first and second support arms includes first through holes aligning with the first through hole of the rocker arm and second through holes aligning with the second through hole of the rocker arm. A bottom surface of the center channel is configured to contact the substantially flat bottom portion of the rocker arm when the fishing rod holder is in the substantially horizontal position. A shaft member projects downward from the support arm assembly. A first end of the shaft member is coupled to the support arm assembly and a second end of the shaft member includes a locking mechanism configured to anchor the fishing rod outrodder to a cross-pin disposed in a gunwale of a boat. The locking mechanism includes a first cutout and a second cutout. The first and second cutouts are configured to simultaneously engage the cross-pin disposed in the gunwale of the boat. Each of the first and second cutouts includes a first rise, a first run and a second rise. A bottom end of the first rise is open, and a bottom end of the second rise is closed by a locking tooth.

According to an exemplary embodiment of the present invention a front surface of the first rise has a curved upper portion.

According to an exemplary embodiment of the present invention an upper portion of the second rise has a curved upper surface.

According to an exemplary embodiment of the present invention a front surface of the locking tooth is substantially aligned with a front surface of the second rise.

According to an exemplary embodiment of the present invention an upper surface of the locking tooth is curved.

According to an exemplary embodiment of the present invention a portion of the upper surface of the locking tooth forms a ninety degree angle with respect to a rear surface of the second rise.

According to an exemplary embodiment of the present invention the curved upper surface of the locking tooth includes a variable pitch with respect to a rear surface of the second rise.

According to an exemplary embodiment of the present invention the variable pitch of the curved upper surface of the locking tooth forms a gradually steeper angle as it approaches the rear surface of the second rise.

According to an exemplary embodiment of the present invention the locking mechanism is configured to engage the cross-pin in the gunwale of the boat such that an upper surface of the cross-pin is in direct contact with the curved upper surface of the second rise.

According to an exemplary embodiment of the present invention an eyelet is disposed on the shaft member. The eyelet may be configured to be coupled to a tether.

According to an exemplary embodiment of the present invention a first end of the tether is coupled to the eyelet and a second end of the tether is coupled to the locking pin.

According to an exemplary embodiment of the present invention the tether is formed of monofilament.

According to an exemplary embodiment of the present invention a protective sleeve is conformally disposed in the fishing rod holder.

BRIEF DESCRIPTION OF THE FIGURES

The above and other features of the present invention will become more apparent by describing in detail exemplary embodiments thereof, with reference to the accompanying drawings, in which.

DETAILED DESCRIPTION

Fishing may involve the use of a wide array of fishing techniques. One such fishing technique is to troll a fishing lure, such as a bunker spoon, behind a boat that is proceeding along the surface of the water. Trolling with a fishing lure, such as a bunker spoon, may include the use of a variety of fishing rods, which may each be equipped with a desired form of fishing line, such as stainless steel wire line, monel trolling line, or metered braid trolling line. When trolling with a fishing lure, such as a bunker spoon, it may be desirable to place the fishing rod in a rod holder which is coupled to the boat.

Figure 1:
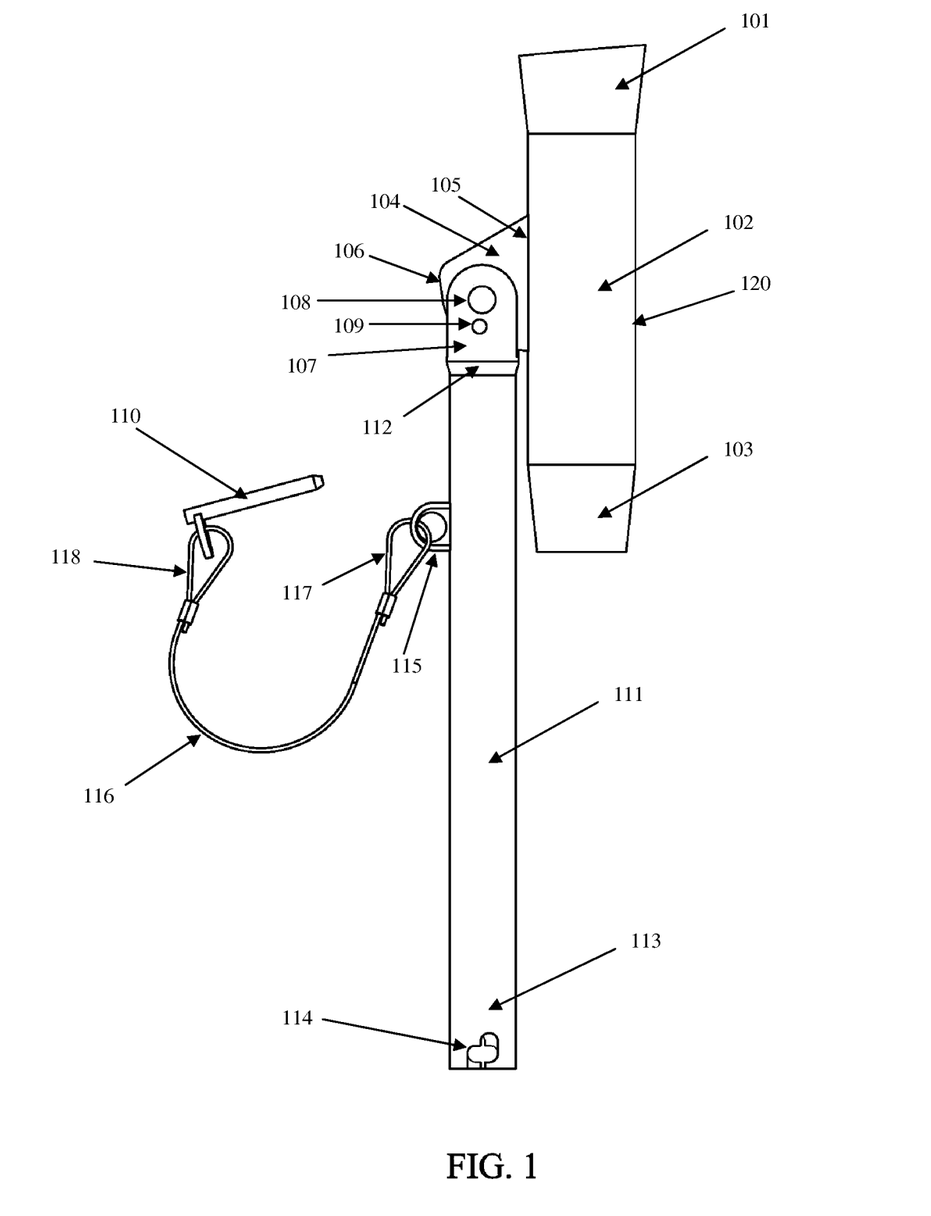
FIG. 1 is a side view of a fishing rod outrodder in a vertical position according to an exemplary embodiment of the present invention.
Figure 2:
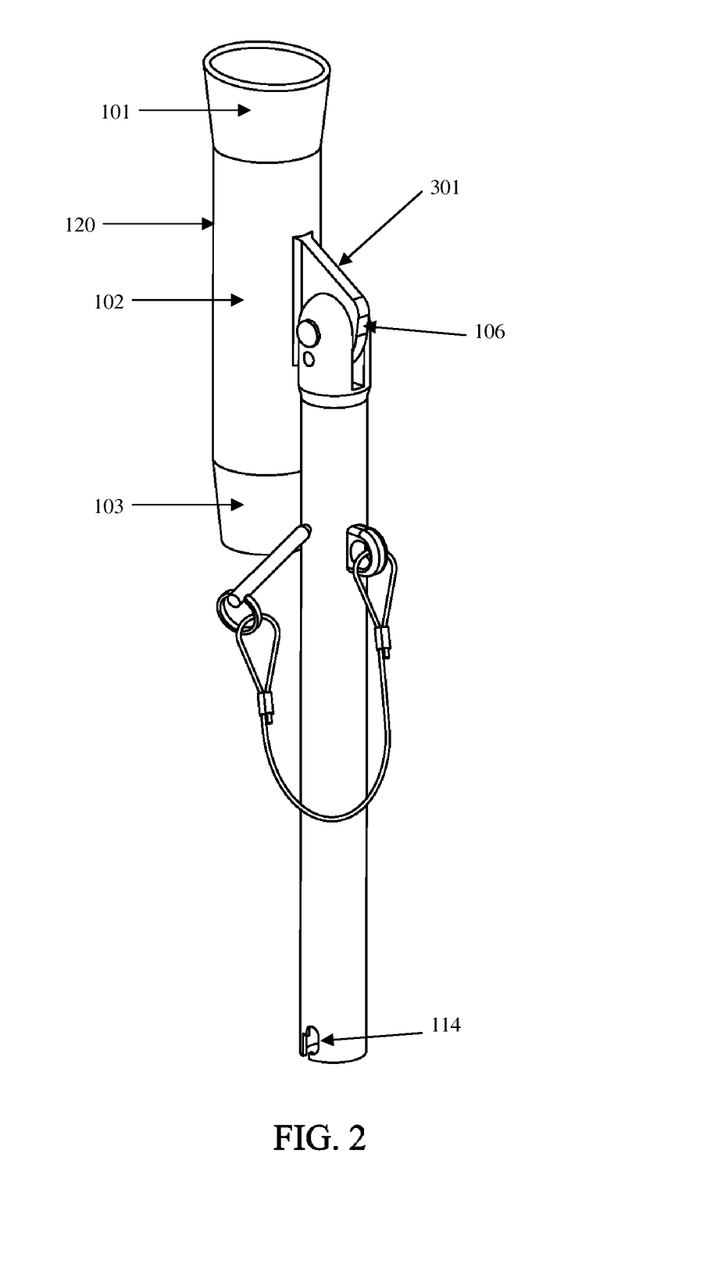
FIG. 2 is an angled side view of a fishing rod outrodder in a vertical position according to an exemplary embodiment of the present invention.
Figure 3:
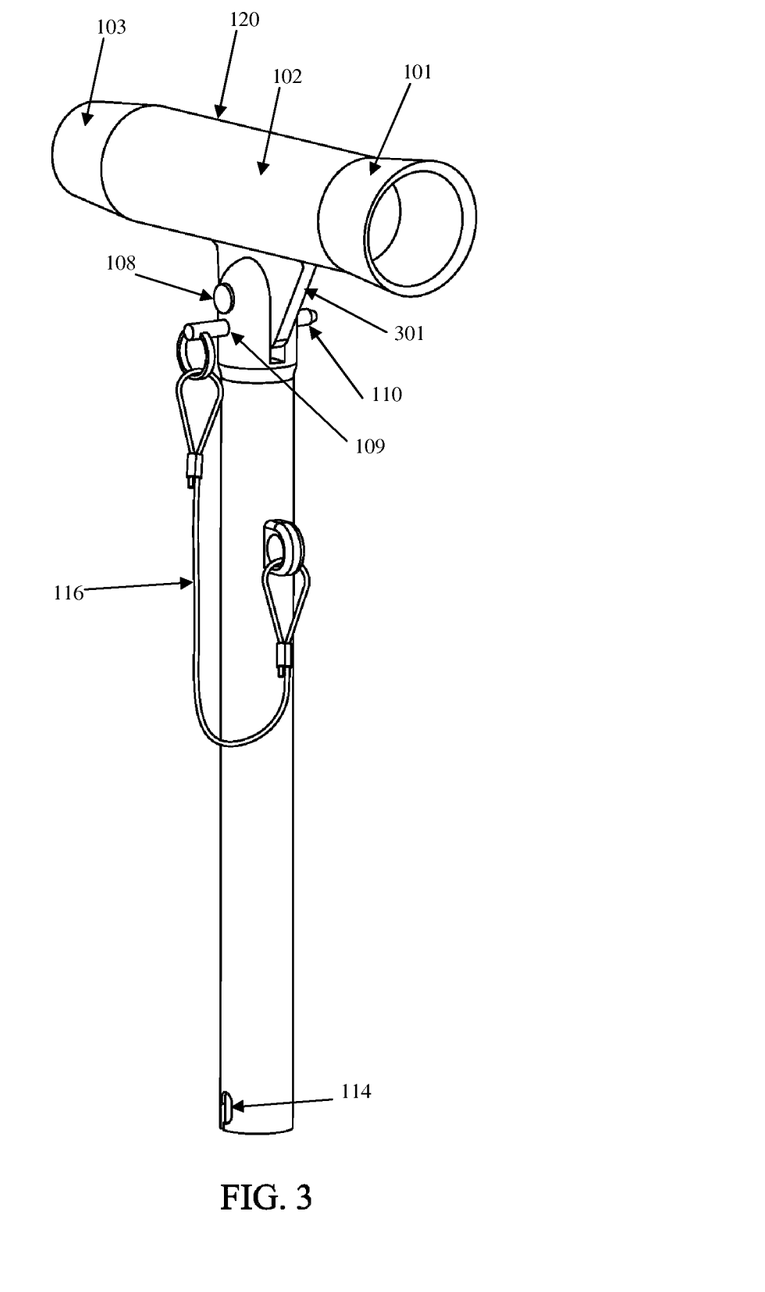
FIG. 3 is an angled side view of a fishing rod outrodder in a horizontal position according to an exemplary embodiment of the present invention.
Figure 4:
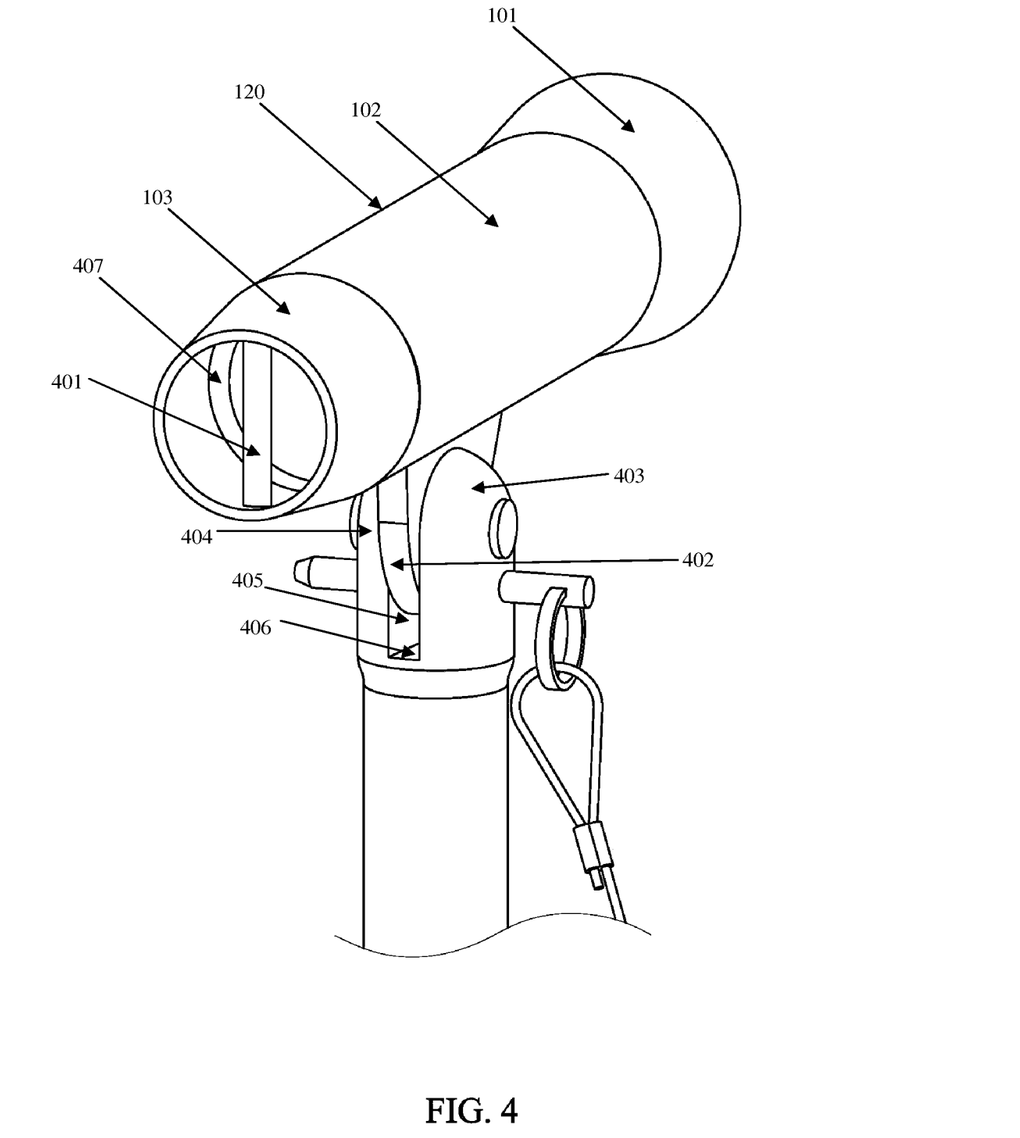
FIG. 4 is a rear angled side view of a fishing rod outrodder in a horizontal position according to an exemplary embodiment of the present invention.
Figure 5A:
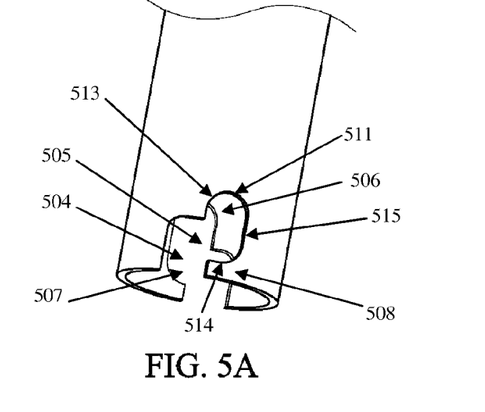
FIGS. 5A, 5B and 5C are views illustrating a locking mechanism according to exemplary embodiments of the present invention.
Figure 5B:
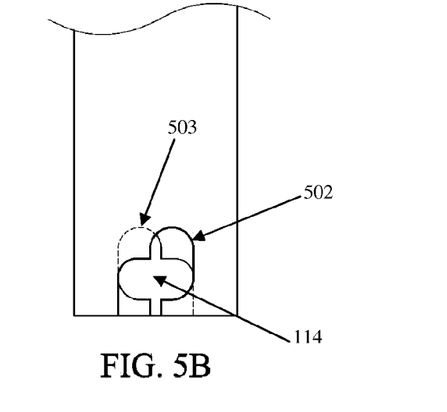
Figure 5C:
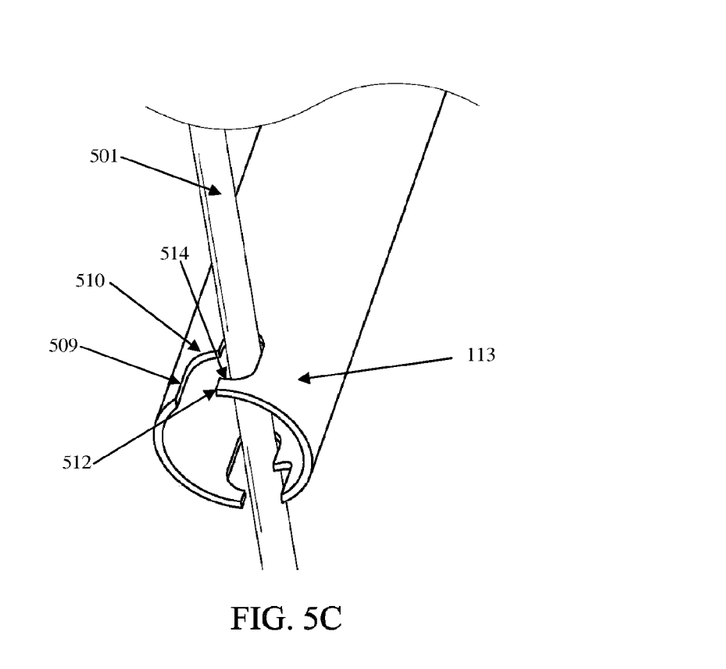

FIG. 1 is a side view of a fishing rod outrodder in a vertical position according to an exemplary embodiment of the present invention. FIG. 2 is an angled side view of a fishing rod outrodder in a vertical position according to an exemplary embodiment of the present invention. FIG. 3 is an angled side view of a fishing rod outrodder in a horizontal position according to an exemplary embodiment of the present invention. FIG. 4 is a rear angled side view of a fishing rod outrodder in a horizontal position according to an exemplary embodiment of the present invention. FIGS. 5A, 5B and 5C are views illustrating a locking mechanism according to exemplary embodiments of the present invention.

Referring to FIGS. 1, 2, 3, 4, 5A, 5B and 5C, a fishing rod outrodder according to exemplary embodiments of the present invention includes a fishing rod holder 120 having an expanded first portion 101, a tubular second portion 102 and a narrowed third portion 103. The narrowed third portion 103 includes a cross-beam 401 configured to contact a bottom surface of a fishing rod. A rocker arm 104 is disposed on a bottom portion 105 of the tubular second portion 102 of the fishing rod holder 120. The rocker arm 104 includes an angled front portion 301, a substantially flat bottom portion 106 and a rounded rear portion 402. The rocker arm 104 is configured to articulate the fishing rod holder 120 between a substantially vertical (see, e.g., FIG. 1 and FIG. 2) and a substantially horizontal position (see, e.g., FIG. 3). The substantially flat bottom portion 106 is configured to stop the fishing rod holder 120 from articulating when the fishing rod holder 120 is in the substantially horizontal position. The rocker arm 104 includes a first through hole 108 configured to rotatably couple the rocker arm 104 to a support arm assembly 107 and a second through hole 109 configured to receive a locking pin 110. The support arm assembly 107 includes a first support arm 403 and a second support arm 404. The support arm assembly 107 includes a center channel 405 configured to receive the rocker arm 104 between the first support arm 403 and the second support arm 404. Each of the first and second support arms 403 and 404 includes first through holes aligning with the first through hole 108 of the rocker arm 104 and second through holes aligning with the second through hole 109 of the rocker arm 104. A bolt or other securing means may be disposed in each of the first through holes to secure the support arm assembly 107 to the rocker arm 104. A bottom surface 406 of the center channel 405 is configured to contact the substantially flat bottom portion 106 of the rocker arm 104 when the fishing rod holder 120 is in the substantially horizontal position. A shaft member 111 projects downward from the support arm assembly 107. A first end 112 of the shaft member 111 is coupled to the support arm assembly 107 and a second end 113 of the shaft member 111 includes a locking mechanism 114 configured to anchor the fishing rod outrodder to a cross-pin 501 disposed in a gunwale of a boat. The locking mechanism 114 includes a first cutout 503 and a second cutout 502. The first and second cutouts 503 and 502 are configured to simultaneously engage the cross-pin 501 disposed in the gunwale of the boat. Each of the first and second cutouts 503 and 502 includes a first rise 504, a first run 505 and a second rise 506. A bottom end 507 of the first rise 504 is open, and a bottom end of the second rise 506 is closed by a locking tooth 508. The fishing rod outrodder may be formed of anodized aluminum.

The dimensions, shape and configuration of the locking mechanism 114 allows the cross-pin 501 in the gunwale of the boat to be both securely engaged by the locking mechanism 114 by rotating the locking mechanism 114 in a first direction, but also allows the cross-pin 501 to be disengaged to remove the fishing rod outrodder from the gunwale of the boat, when desired, by rotating the locking mechanism 114 in a second direction that is opposite to the first direction. The dimension, shape and configuration of the locking mechanism 114 allows the cross-pin to be securely engaged while the fishing rod outrodder is in use for trolling a fishing lure.

The fishing rod outrodder may be provided as a set of two fishing rod outrodders. A first fishing rod outrodder may include a first locking mechanism configured to engage a first cross-pin in a starboard side of the boat, while a second fishing rod outrodder may include a second locking mechanism configured to engage a second cross-pin in a port side of the boat. Thus, the directional orientation of the first and second locking mechanisms of the first and second fishing rod outrodders may be opposite to each other.

The fishing rod outrodder according to exemplary embodiments of the present invention may be configured to be disposed in a fishing rod holder commonly built into a gunwale of a boat, such as a fishing boat. For example, the fishing rod outrodder may be configured to be disposed in a flush mount rod holder that is built into the gunwale of the boat when the boat is manufactured. Alternatively, the fishing rod outrodder may be disposed in any other fishing rod holder that is added to the gunwale of the boat after the boat is initially manufactured.

According to exemplary embodiments of the present invention the cross-beam 401 configured to contact a bottom surface of a fishing rod may be a vertical cross-beam, but exemplary embodiments of the present invention are not limited thereto. For example, the cross-beam 401 may be a horizontal cross-beam, or may be at any angle to contact the bottom surface of the fishing rod. The cross-beam 401 may be configured to rotatably securer a fishing rod having one or more indentations on its bottom surface. For example, the cross-beam 401 may be configured to secure a fishing rod having a cross-shaped indent to prevent the fishing rod from rotating during trolling. The cross-beam 401 may be configured to rotatably secure the fishing rod with fishing line eyelets of the fishing rod facing in the direction of movement of the boat in a forward direction or in a direction opposite to the movement of the boat in a forward direction.

According to exemplary embodiments of the present invention the rocker arm 104 may be configured to rotate the fishing rod disposed in the fishing rod holder 120 to be substantially parallel to a plane of the ocean or other water way along which the boat is traveling (e.g., the horizontal position illustrated in FIG. 3), but perpendicular to a lengthwise direction of the gunwale of the boat. That is, the fishing rod holder 120 in the horizontal position may face a direction that is perpendicular to the direction the boat is moving. The rocker arm 104 may be configured to articulate or rotate the fishing rod disposed in the fishing rod holder 120 so that after a fish has been hooked, the fishing rod holder 120 can be rotated to the vertical position (e.g., the vertical position illustrated in FIGS. 1 and 2). Thus, the fishing rod may be more easily lifted from the fishing rod holder 120 when a large fish has been hooked, and substantial tension is being placed on the fishing rod disposed in the fishing rod holder 120.

According to an exemplary embodiment of the present invention a front surface 509 of the first rise 504 has a curved upper portion 510. The curved upper portion 510 allows the cross-pin 501 to more easily be guided into its stationary or locked position in which the top surface of the cross-pin 501 is in direct contact with the upper portion 511 of the second rise 506, as described in more detail below. The cross-pin 501 is guided into the stationary or locked position after passing through the bottom end 507 of the first rise 504. That is, the curved upper portion 510 guides the cross-pin 501 into an upper region of the second rise 506. The size and dimensions of the bottom end 507 and the entire locking mechanism 114 is configured to allow the cross-pin 501 commonly found in the gunwale of the boat to pass into the stationary or locked position in the upper region of the second rise 506 by rotating the fishing rod outrodder.

According to an exemplary embodiment of the present invention an upper portion 511 of the second rise 506 has a curved upper surface. The curved upper surface of the upper portion 511 of the second rise 506 has a shape and size corresponding to a shape and size of the cross-pin 501 (e.g., the cross-pin commonly found in the gunwale of the boat). The upper portion 511 of the second rise 506 is configured to securely hold the fishing rod outrodder in the gunwale of the boat.

According to an exemplary embodiment of the present invention a front surface 512 of the locking tooth 508 is substantially aligned with a front surface 513 of the second rise 506. The front surface 512 of the locking tooth 508 is configured to guide the cross-pin 501 toward the curved upper portion 510 of the first rise 504. The locking tooth 508 is configured to prevent the fishing rod outrodder from being unintentionally removed from the gunwale of the boat if it is unintentionally lifted in an upward direction. The locking tooth 508 prevents the fishing rod outrodder from being removed without deliberately rotating the fishing rod outrodder. Thus, loss of the fishing rod outrodder by dropping it in the ocean or other body of water after unintentional removal from the gunwale of the boat may be prevented.

According to an exemplary embodiment of the present invention an upper surface 514 of the locking tooth 508 is curved. The curved upper surface 514 of the locking tooth 508 may guide the cross-pin 501 back toward the first rise 504 when the fishing rod outrodder is deliberately rotated to release the fishing rod outrodder from the gunwale of the boat. Thus, the curved upper surface 514 of the locking tooth 508 may assist with easy removal of the fishing rod outrodder from the gunwale of the boat, when desired.

According to an exemplary embodiment of the present invention a portion of the upper surface 514 of the locking tooth 508 forms a ninety degree angle with respect to a rear surface 515 of the second rise 506. The rear surface 515 of the second rise 506 may guide the cross-pin 501 toward the upper portion 511 of the second rise 506 to securely fix the cross-pin 501.

According to an exemplary embodiment of the present invention the curved upper surface 514 of the locking tooth 508 includes a variable pitch with respect to the rear surface 515 of the second rise 506. The variable pitch of the curved upper surface 514 of the locking tooth 508 may guide the cross-pin 501 back toward the first rise 504 when the fishing rod outrodder is deliberately rotated to release the fishing rod outrodder from the gunwale of the boat. Thus, the variable pitch of the curved upper surface 514 of the locking tooth 508 may assist with easy removal of the fishing rod outrodder from the gunwale of the boat, when desired.

According to an exemplary embodiment of the present invention the variable pitch of the curved upper surface 514 of the locking tooth 508 forms a gradually steeper angle as it approaches the rear surface 515 of the second rise 506. The variable pitch of the curved upper surface 514 of the locking tooth 508 may start at substantially zero degrees with respect to a horizontal direction and may gradually increase to about 45 degrees at a central portion of the variable pitch, and finally the upper surface 514 of the locking tooth 508 may reach a ninety degree angle with respect to the horizontal direction. For example, the initial pitch of the upper surface 514 of the locking tooth 508 may be about 10 degrees with respect to the horizontal direction and may increase to about 45 degrees with respect to the horizontal direction before merging with the rear surface 515 of the second rise 506.

According to an exemplary embodiment of the present invention the locking mechanism 114 is configured to engage the cross-pin 501 in the gunwale of the boat such that an upper surface of the cross-pin 501 is in direct contact with the upper portion 511 of the second rise 506.

According to an exemplary embodiment of the present invention an eyelet 115 is disposed on the shaft member 111. The eyelet 115 may be configured to be coupled to a tether 116. According to an exemplary embodiment of the present invention a first end 117 of the tether 116 is coupled to the eyelet 115 and a second end 118 of the tether 116 is coupled to the locking pin 110. According to an exemplary embodiment of the present invention the tether 116 is formed of monofilament.

According to an exemplary embodiment of the present invention a protective sleeve 407 is conformally disposed in the fishing rod holder. The protective sleeve 407 may include plastic or rubber. The protective sleeve 407 is configured to prevent damage to the fishing rod disposed in the fishing rod holder 120.

Figure 6A:
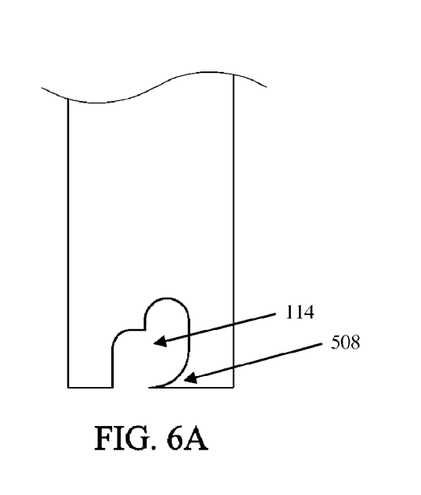
FIG. 6A is a view illustrating a locking mechanism configuration according to an exemplary embodiment of the present invention.
Figure 6B:
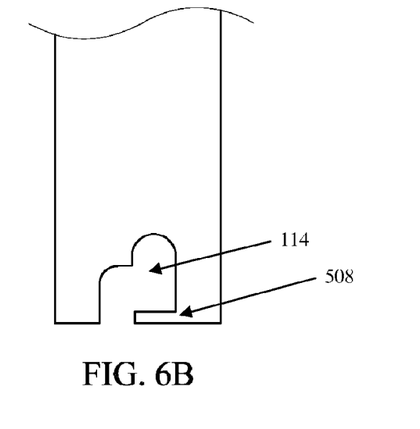
FIG. 6B is a view illustrating a locking mechanism configuration according to an exemplary embodiment of the present invention.
Figure 6C:
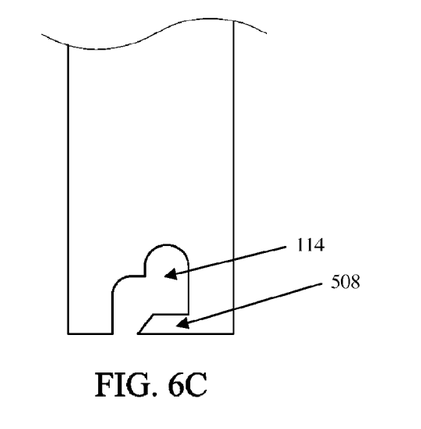
FIG. 6C is a view illustrating a locking mechanism configuration according to an exemplary embodiment of the present invention.

FIG. 6A is a view illustrating a locking mechanism configuration according to an exemplary embodiment of the present invention. FIG. 6B is a view illustrating a locking mechanism configuration according to an exemplary embodiment of the present invention. FIG. 6C is a view illustrating a locking mechanism configuration according to an exemplary embodiment of the present invention.

Referring to FIGS. 6A, 6B and 6C, the locking mechanism 114 may include the locking tooth 508 in a number of configurations. For example, referring to FIG. 6A, the upper surface of the locking tooth 508 may have a curved upper surface and a pointed front surface. Referring to FIG. 6B, the upper surface of the locking tooth 508 may not be curved and may form a ninety degree angle with the rear surface 515 of the second rise 506. Referring to FIG. 6C, the front surface of the locking tooth 508 may be angled or pitched with respect to the upper surface of the locking tooth 508, and the upper surface of the locking tooth 508 might not be curved.

While the present invention has been particularly shown and described with reference to exemplary embodiments thereof, it will be understood by those of ordinary skill in the art that various changes in form and detail may be made therein without departing from the spirit and scope of the present invention as defined by the following claims.

What is claimed is:

1. A fishing rod outrodder, comprising:
a fishing rod holder comprising an expanded first portion, a tubular second portion and a narrowed third portion, wherein the narrowed third portion comprises a cross-beam configured to contact a bottom surface of a fishing rod;
a rocker arm disposed on a bottom portion of the tubular second portion of the fishing rod holder, wherein the rocker arm comprises an angled front portion, a substantially flat bottom portion and a rounded rear portion, wherein the rocker arm is configured to articulate the fishing rod holder between a substantially vertical and a substantially horizontal position, wherein the substantially flat bottom portion is configured to stop the fishing rod holder from articulating when the fishing rod holder is in the substantially horizontal position, and wherein the rocker arm comprises a first through hole configured to rotatably couple the rocker arm to a support arm assembly and a second through hole configured to receive a locking pin;
the support arm assembly comprising a first support arm and a second support arm, wherein the support arm assembly comprises a center channel configured to receive the rocker arm between the first support arm and the second support arm, wherein each of the first and second support arms comprises first through holes aligning with the first through hole of the rocker arm and second through holes aligning with the second through hole of the rocker arm, and wherein a bottom surface of the center channel is configured to contact the substantially flat bottom portion of the rocker arm when the fishing rod holder is in the substantially horizontal position;
a shaft member projecting downward from the support arm assembly, wherein a first end of the shaft member is coupled to the support arm assembly and a second end of the shaft member comprises a locking mechanism configured to anchor the fishing rod outrodder to a cross-pin disposed in a gunwale of a boat, the locking mechanism comprising:
a first cutout and a second cutout, wherein the first and second cutouts are configured to simultaneously engage the cross-pin disposed in the gunwale of the boat, wherein each of the first and second cutouts comprises:
a first rise, wherein a front surface of the first rise has a curved upper portion, a first run and a second rise, wherein an upper portion of the second rise has a curved upper surface, wherein a bottom end of the first rise is open, wherein a bottom end of the second rise is closed by a locking tooth, wherein a front surface of the locking tooth is substantially aligned with a front surface of the second rise, wherein an upper surface of the locking tooth is curved, and wherein the curved upper surface of the locking tooth comprises a variable pitch with respect to a rear surface of the second rise.

2. The fishing rod outrodder of claim 1, wherein a portion of the upper surface of the locking tooth forms a ninety degree angle with respect to a rear surface of the second rise.

3. The fishing rod outrodder of claim 1, wherein the variable pitch of the curved upper surface of the locking tooth forms a gradually steeper angle as it approaches the rear surface of the second rise.

4. The fishing rod outrodder of claim 3, wherein the locking mechanism is configured to engage the cross-pin in the gunwale of the boat such that an upper surface of the cross-pin is in direct contact with the curved upper surface of the second rise.

5. The fishing rod outrodder of claim 4, further comprising an eyelet disposed on the shaft member, wherein the eyelet is configured to be coupled to a tether.

6. The fishing rod outrodder of claim 5, wherein a first end of the tether is coupled to the eyelet, and wherein a second end of the tether is coupled to the locking pin.

7. The fishing rod outrodder of claim 6, wherein the tether is formed of monofilament.

8. The fishing rod outrodder of claim 7, further comprising a protective sleeve conformally disposed in the fishing rod holder.

* * * * *